(12) United States Patent
Schanz

(10) Patent No.: US 6,937,375 B2
(45) Date of Patent: Aug. 30, 2005

(54) SCANNING DEVICE

(75) Inventor: Holger Schanz, Lindau (DE)

(73) Assignee: Automotive Distance Control Systems GmbH, Lindau (DE)

( * ) Notice: Subject to any disclaimer, the term of this patent is extended or adjusted under 35 U.S.C. 154(b) by 0 days.

(21) Appl. No.: 10/487,716

(22) PCT Filed: Jul. 31, 2002

(86) PCT No.: PCT/DE02/02864

§ 371 (c)(1),
(2), (4) Date: Feb. 27, 2004

(87) PCT Pub. No.: WO03/027752

PCT Pub. Date: Apr. 3, 2003

(65) Prior Publication Data

US 2004/0240020 A1 Dec. 2, 2004

(30) Foreign Application Priority Data

Aug. 31, 2001 (DE) .......................................... 101 42 425

(51) Int. Cl.[7] .............................................. G02B 26/08
(52) U.S. Cl. ........................ 359/211; 359/209; 359/205; 359/201; 359/742
(58) Field of Search ................................. 359/196, 201, 359/205, 209, 211, 222, 833, 834, 837, 741, 742

(56) References Cited

U.S. PATENT DOCUMENTS

| 4,606,601 A | | 8/1986 | Starkweather |
| 4,668,859 A | | 5/1987 | Winterer |
| 4,878,720 A | | 11/1989 | Hanke et al. |
| 5,018,803 A | * | 5/1991 | Hecker et al. ................. 359/17 |
| 5,189,545 A | | 2/1993 | Takata et al. |
| 5,223,956 A | | 6/1993 | Kramer et al. |
| 5,227,784 A | | 7/1993 | Masamori et al. |
| 5,293,162 A | | 3/1994 | Bachalo |
| 5,309,212 A | | 5/1994 | Clark |
| 5,367,399 A | | 11/1994 | Kramer |
| 5,426,529 A | | 6/1995 | Zelenka |
| 5,583,685 A | * | 12/1996 | Ohtomo et al. ............. 359/197 |
| 5,757,501 A | | 5/1998 | Hipp |
| 5,864,391 A | | 1/1999 | Hosokawa et al. |
| 5,933,225 A | | 8/1999 | Yamabuchi |
| 6,456,024 B1 | | 9/2002 | Schmider et al. |
| 2004/0212863 A1 | | 10/2004 | Schanz et al. |
| 2004/0222366 A1 | | 11/2004 | Frick |
| 2004/0233491 A1 | | 11/2004 | Schanz et al. |

FOREIGN PATENT DOCUMENTS

| DE | 34 23 536 | 1/1986 |
| DE | 40 15 920 | 11/1990 |
| DE | 41 40 716 | 6/1992 |
| DE | 41 15 747 | 11/1992 |
| DE | 41 32 025 | 4/1993 |
| DE | 43 04 499 | 9/1993 |
| DE | 42 39 061 | 5/1994 |
| DE | 195 30 281 | 2/1997 |
| DE | 197 13 826 | 10/1997 |

(Continued)

Primary Examiner—James Phan
(74) Attorney, Agent, or Firm—W.F. Fasse; W.G. Fasse

(57) ABSTRACT

A scanning apparatus includes a radiation source for emitting a light beam, a rotatable prism for deflecting the light beam, and a lens arrangement for projecting the light beam onto a scene to be scanned. The path length that is traversed by the light beam from the radiation source to the lens arrangement is dependent on the angular position of the prism. To avoid a defocussing, the light beam is collimated so that it penetrates through the lens arrangement in a lens section that is dependent on the angular position of the prism, and the lens arrangement has different focal lengths for various lens sections. The focal lengths of the lens sections are thereby selected so that the radiation source respectively lies in the focal point of the lens section that is penetrated by the light beam. A preferred application is for optical spacing distance radar for motor vehicles.

6 Claims, 1 Drawing Sheet

FOREIGN PATENT DOCUMENTS

| | | |
|---|---|---|
| DE | 37 07 023 | 9/1998 |
| EP | 0138646 | 4/1985 |
| EP | 0805357 | 11/1997 |
| EP | 1104950 | 6/2001 |
| GB | 1562190 | 3/1980 |
| JP | 55-046712 | 4/1980 |
| JP | 60-079312 | 5/1985 |
| JP | 62-008119 | 1/1987 |
| JP | 09-021872 | 1/1997 |
| JP | 10-186260 | 7/1998 |
| WO | WO 92/05455 | 4/1992 |
| WO | WO 93/06517 | 4/1993 |

* cited by examiner

SCANNING DEVICE

FIELD OF INVENTION

The invention relates to a scanning device using a rotating prism and a lens for deflecting and projecting a light beam onto a scene.

BACKGROUND INFORMATION

Such a scanning device is, for example, known from the DE 41 15 747 C2. The known apparatus comprises a radiation source, a rotatable plane-parallel prism, and a lens arrangement. The radiation source emits a light beam, which penetrates through the prism and which is subsequently projected via the lens arrangement onto a scene that is to be scanned. Thereby, the light beam is refracted on two refraction planes of the prism. Due to the parallelism of these two refraction planes, the light beam entering into the prism and the light beam exiting from the prism are offset parallel to one another by a value dependent on the angular position of the prism. Through rotation of the prism, this offset is varied, and the light beam is thus moved over the scene that is to be scanned.

The essential disadvantage of this apparatus exists in that the length of the path, which the light beam traverses from the radiation source to the lens arrangement, is dependent on the angular position of the prism, so that the light beam is defocussed by the rotation of the prism during the scanning process.

SUMMARY OF THE INVENTION

Therefore, it is the underlying object of the invention to present a scanning apparatus of the type generally mentioned above, in which the light beam is not defocussed or is defocussed as little as possible during the scanning process.

The above object is achieved in a scanning apparatus according to the invention, having features as discussed in the following.

The scanning apparatus according to the invention comprises an emitting part, which in turn comprises a radiation source for emitting a light beam, a rotatable prism for deflecting the light beam, and a lens arrangement for projecting the deflected light beam onto a scene that is to be scanned, whereby the light beam is bundled or collimated in such a manner so that it penetrates through the lens arrangement in a lens section that is dependent on the angular position of the prism, and whereby the lens arrangement comprises lens sections with different focal lengths, which are respectively selected in such a manner, so that the radiation source respectively lies in the focal point of the respective lens section through which the light beam passes.

Preferably, the radiation source is positioned with respect to the prism in such a manner so that the deflection of the light beam in the prism is achieved by total reflection. The lens arrangement is preferably embodied as a Fresnel lens and the radiation source is preferably embodied as a laser diode, particularly as an infrared laser diode.

In an advantageous further development, the scanning apparatus comprises a receiving part, which in turn comprises a photodetector, a further prism similar to the prism of the emitting part, and a further lens arrangement similar to the lens arrangement of the emitting part. In that context, the prisms of the emitting and receiving parts are rotated synchronously to each other about the same rotation axis or about rotation axes that are parallel to one another. The position of the photodetector with respect to the further prism and the further lens arrangement corresponds to the position of the radiation source with respect to the prism and the lens arrangement of the emitting part. Thus, the photodetector is positioned in such a manner so that a reflection beam resulting from the light beam is projected or imaged onto the photodetector via the further lens arrangement and the further prism.

The scanning apparatus according to the invention is best suited to the production of a spacing distance radar for motor vehicles. Such a spacing distance radar can be utilized in a spacing distance regulation system for determining the spacing distance to a preceding vehicle. In that context, the spacing distance determination is based on the determination of the signal transit time (echo time) of the emitted and reflected light beam.

BRIEF DESCRIPTION OF THE DRAWINGS

The invention will be described in further detail in the following, in connection with example embodiments and figures. It is shown by.

DETAILED DESCRIPTION OF AN EXAMPLE EMBODIMENT OF THE INVENTION

Figure 1:
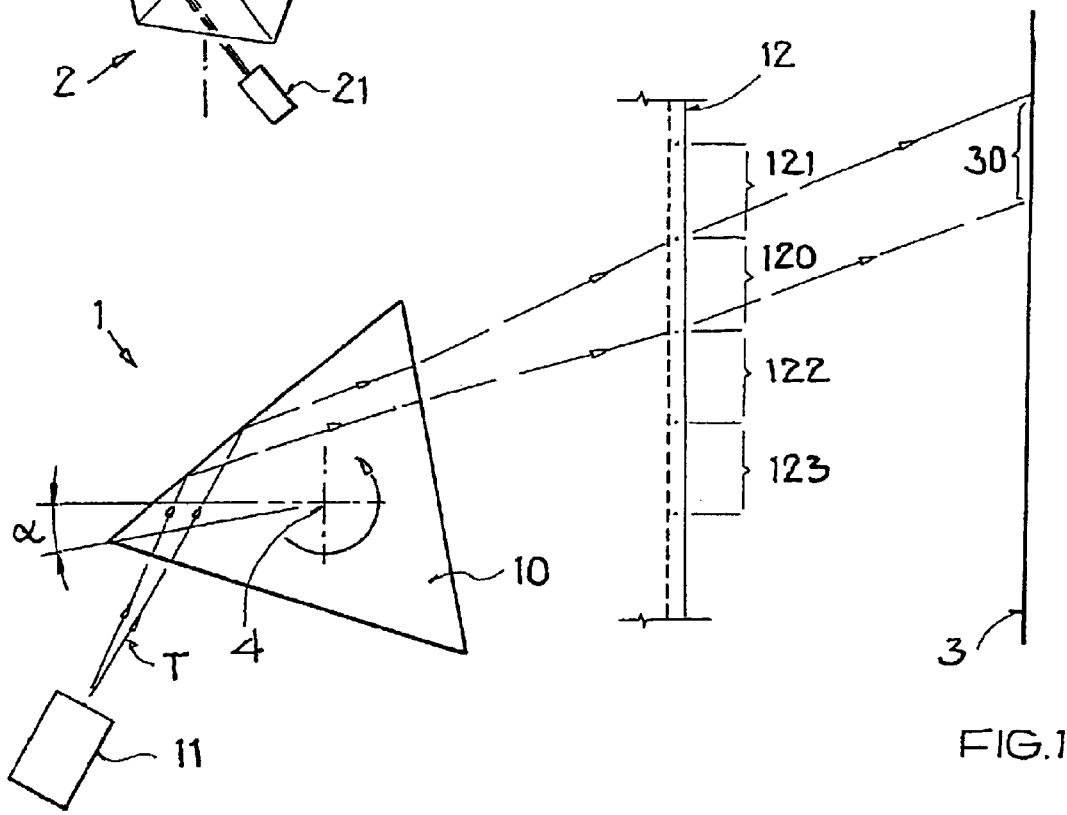
FIG. 1 a principle illustration of an emitting part of an optical scanning apparatus.

According to FIG. 1, the emitting part of an optical scanning apparatus comprises a radiation source 11, for example embodied as an infrared laser diode, a prism 10 with a triangular cross section, and a lens arrangement 12 embodied as a Fresnel lens. The radiation source 11 emits a light beam T from a position that is fixed with respect to the prism 10 and the lens arrangement 12, in a direction of the prism 10. Thereby, the light beam T penetrates through an entrance surface into the prism 10, is deflected by total reflection in the prism 10 on a side wall of the prism 10, and subsequently again exits out of the prism 10 through an exit surface. During the penetration of the entrance or exit surface, the light beam T is refracted if applicable as the case may be. After the exit out of the prism 10, the light beam T is projected or imaged via the lens arrangement 12 onto a scene 3 that is to be scanned, that is to say the radiation source 11 illuminates a limited region 30 of the scene 3. In that context, the light beam T is bundled or collimated in such a manner, so that it impinges onto only one lens section 120, that is to say onto only one partial region of the lens arrangement 12, and penetrates through the lens arrangement 12 only in this lens section 120.

During the scanning process, the prism 10 is rotated. Hereby, the reflection angle of the light beam in the interior of the prism 10 is changed, which leads to a change of the deflection of the light beam T. Due to this change, the light beam T is moved over lens arrangement 12 and over the scene 3. The position of the lens section 120 penetrated by the light beam T thus depends on the angular position a of the prism 10.

The lens arrangement 12 comprises lens sections 120, 121, 122, 123 with different focal lengths. In that context, the focal lengths of the individual lens sections 120, 121, 122, 123 are selected in such a manner so that the radiation source 11 respectively lies in the focal point of the lens section 120 or 121 or 122 or 123 respectively, which is penetrated by the light beam T. In the angular position a illustrated in FIG. 1, the radiation source 11 thus lies in the focal point of the lens section 120. Due to the different focal lengths of the individual lens sections, one achieves that the light beam T remains focused even in connection with a change of the angular position a despite the length of the light path between the radiation source 11 and the lens arrangement 12 being dependent on the angular position α.

Figure 2:
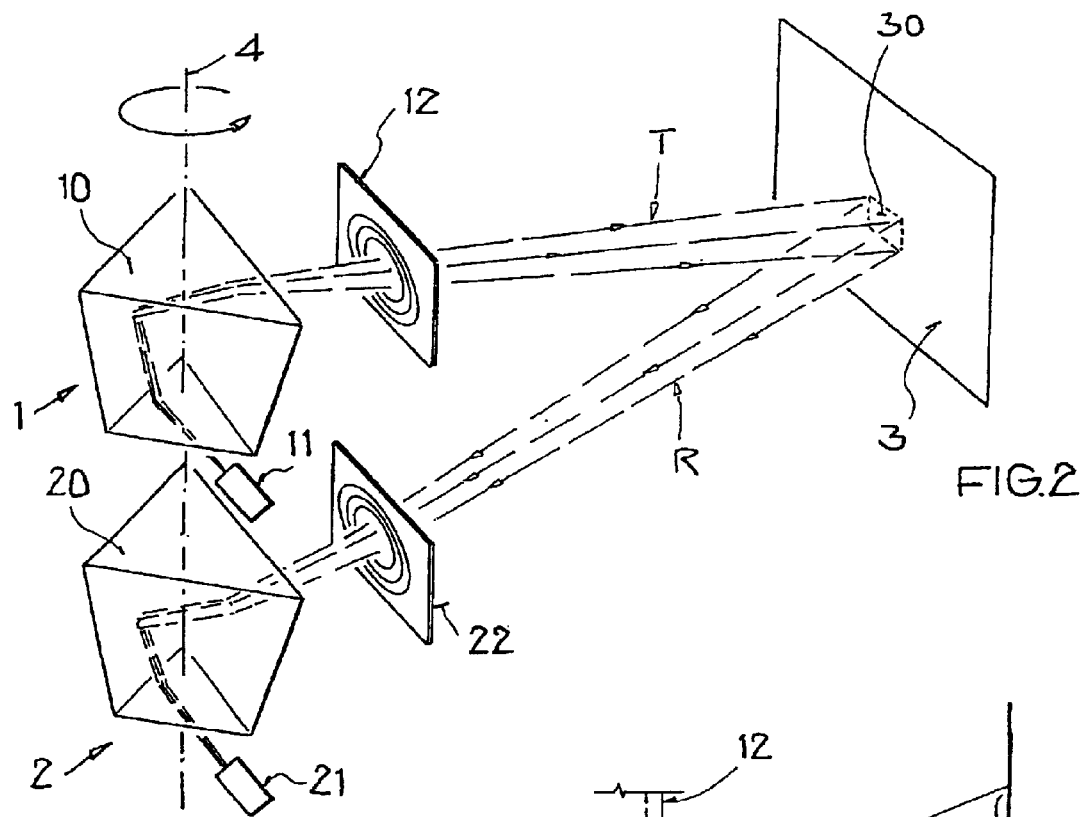
FIG. 2 a principle illustration of an optical scanning apparatus with an emitting part according to FIG. 1.

According to FIG. 2, the scanning apparatus comprises, in addition to the emitting part 1, also a receiving part 2, which is constructed analogously to the emitting part 1. Thus, the receiving part 2 comprises a further prism 20 corresponding to the prism 10 of the emitting part 1, and a further lens arrangement 22 corresponding to the lens arrangement 12 of the emitting part 1. In that context, the prisms 10, 20 and the lens arrangements 12, 22 are respectively embodied the same. The difference between the emitting part 1 and the receiving part 2 exists in that the receiving part 2 comprises a photodetector 21, for example embodied as a PIN diode, instead of the radiation source 11. The relative position of the photodetector 21 with respect to the prism 20 and the lens arrangement 22 thereby corresponds to the relative position of the radiation source 11 with respect to the prism 10 and the lens arrangement 12.

The prisms 10, 20 are rotated synchronously with respect to one another. In that context, the rotation can be carried out about the same rotation axis 4 or about rotation axes parallel to one another. Thereby the photodetector 21 detects the portion of the light beam T emitted by the radiation source 11 that is reflected from the region 30 of the scene 3. This reflected portion is focused as a reflection beam R onto the photodetector 21. The focusing is ensured also in connection with a change of the angular position α of the prisms 10, 20 and thus also in connection with a change of the position of the region 30 illuminated by the radiation source 11, because the photodetector 21 respectively lies in the focal point of the respective lens section through which the reflection beam R falling onto the photodetector 21 passes, due to the same embodiment of the lens arrangement 12, 22.

Due to the rotation of the prisms 10, 20, the light beam T is moved perpendicularly to the rotation axis, thus horizontally in the present example embodiment, over the scene 3. The prisms 10, 20 can comprise side surfaces that are tilted relative to their rotation axis. Thereby, one additionally achieves a deflection of the light beam T in the direction of the rotation axis 4, thus a vertical deflection in the present example embodiment. The scene 3 is then scanned two-dimensionally in several lines.

By evaluating the signal transit time of the signal that is emitted as the light beam T and reflected as the reflection beam R, the spacing distance between the scanning apparatus and the location at which the light beam T is reflected can then be determined.

Therefore, the scanning apparatus is best suited for application in a system for supporting or assisting the driver of a motor vehicle, especially in a spacing distance regulation system for motor vehicles. In such an application, the scene located in the driving direction in front of the motor vehicle is scanned with the scanning apparatus, in order to recognize objects located in front of the motor vehicle, especially preceding motor vehicles, and to determine the spacing distances to these objects. In connection with the determined spacing distances it is then tested whether the safety spacing to a preceding vehicle is being maintained, and if applicable as the case may be, a warning signal is provided to the driver, or an automatic spacing distance regulation of the spacing distance to the preceding vehicle is carried out.

With the scanning apparatus, also the lateral driving path or roadway area with respect to the motor vehicle can be scanned, in order to recognize roadway markings that are provided for bounding the driving lanes on the roadway, and to warn the driver before leaving the driving lane, or to ensure an automatic driving lane maintenance.

What is claimed is:

1. Scanning apparatus with an emitting part (1) that comprises a radiation source (11) for emitting a light beam (T), a rotatable prism (10) for deflecting the light beam (T), and a lens arrangement (12) for projecting the deflected light beam (T) onto a scene that is to be scanned, characterized in that the light beam (T) is collimated in such a manner so that it penetrates through the lens arrangement (12) in a lens section that is dependent on the angular position (α) of the prism (10), in that the lens arrangement (12) comprises lens sections (120, 121, 122, 123) with different focal lengths, and in that the focal lengths of the lens sections (120, 121, 122, 123) are selected in such a manner so that the radiation source (11) respectively lies in the focal point of the lens section (120) that is penetrated by the light beam (T).

2. Scanning apparatus according to claim 1, characterized in that the radiation source (11) is positioned with respect to the prism (10) in such a manner so that the light beam (T) is deflected by total reflection in the prism (10) to the lens arrangement (12).

3. Scanning apparatus according to claim 1, characterized in that the lens arrangement (12) is embodied as a Fresnel lens.

4. Scanning apparatus according to claim 1, characterized in that the radiation source (11) is embodied as a laser diode.

5. Scanning apparatus according to claim 1, characterized in that the scanning apparatus further comprises a receiving part (2) with a photodetector (21), a further prism (20) similar to the prism (10) of the emitting part (1), and a further lens arrangement (22) similar to the lens arrangement (12) of the emitting part (2), in that the prisms (10, 20) are rotatable synchronously with respect to one another about the same rotation axis (4) or about rotation axes that are parallel to one another, and in that the photodetector (21) is positioned in such a manner so that a reflection beam (R) resulting from the light beam (T) is projected thereonto via the further lens arrangement (22) and the further prism (21).

6. Use of the scanning apparatus according to claim 1 as a spacing distance radar for motor vehicles.

* * * * *

UNITED STATES PATENT AND TRADEMARK OFFICE
CERTIFICATE OF CORRECTION

PATENT NO. : 6,937,375 B2 Page 1 of 1
DATED : August 30, 2005
INVENTOR(S) : Schanz It is certified that error appears in the above-identified patent and that said Letters Patent is hereby corrected as shown below:

Column 2,
Line 60, after "position" replace "a" by -- $\alpha$ --.

Column 3,
Lines 1 and 6, after "position" replace "a" by -- $\alpha$ --.

Signed and Sealed this

Tenth Day of January, 2006

JON W. DUDAS
*Director of the United States Patent and Trademark Office*